US012366887B2

United States Patent
Picciotto et al.

(10) Patent No.: US 12,366,887 B2
(45) Date of Patent: Jul. 22, 2025

(54) SYSTEMS AND METHODS FOR WIRELESS CHARGER DOCKING

(71) Applicant: Microsoft Technology Licensing, LLC, Redmond, WA (US)

(72) Inventors: Carl Edward Picciotto, Clyde Hill, WA (US); Daniel Thomas Nevistic, Bellevue, WA (US); Oscar Hochun To, Seattle, WA (US); Ibrahim Iskender Kushan, Seattle, WA (US); Henri Antero Autio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/581,798

(22) Filed: Feb. 20, 2024

(65) Prior Publication Data
US 2024/0192725 A1    Jun. 13, 2024

Related U.S. Application Data

(63) Continuation of application No. 17/765,419, filed as application No. PCT/US2020/053332 on Sep. 29, 2020, now Pat. No. 11,940,838.

(30) Foreign Application Priority Data

Sep. 30, 2019    (NL) ..................................... 2023919

(51) Int. Cl.
| | |
|---|---|
| *G06F 1/16* | (2006.01) |
| *G06F 3/023* | (2006.01) |
| *G06F 3/0354* | (2013.01) |
| *G06F 3/038* | (2013.01) |
| *H02J 50/00* | (2016.01) |
| *H04M 1/21* | (2006.01) |

(52) U.S. Cl.
CPC .......... *G06F 1/1632* (2013.01); *G06F 3/0231* (2013.01); *G06F 3/03541* (2013.01); *G06F 3/03545* (2013.01); *G06F 3/038* (2013.01); *H02J 50/00* (2016.02); *H04M 1/21* (2013.01); *G06F 2203/0384* (2013.01)

(58) Field of Classification Search
CPC ............................. G06F 3/0231; G06F 1/1632
USPC .................................................. 345/168, 174
See application file for complete search history.

(56) References Cited

U.S. PATENT DOCUMENTS

| | | | |
|---|---|---|---|
| 6,216,187 B1 * | 4/2001 | Truong ..................... | G06F 1/26 710/303 |
| 2015/0092608 A1 * | 4/2015 | Gossain ................ | G05B 15/02 370/256 |
| 2020/0287416 A1 * | 9/2020 | Sauterel .............. | G06F 3/03543 |

FOREIGN PATENT DOCUMENTS

CN          107665047 B      2/2021

OTHER PUBLICATIONS

First Examination Report Received for Indian Application No. 202247006997, mailed on Sep. 29, 2024, 06 pages.

(Continued)

*Primary Examiner* — Calvin C Ma
(74) *Attorney, Agent, or Firm* — RAY QUINNEY & NEBEKER P.C.; Paul N. Taylor (57) ABSTRACT

A method of docking an accessory device includes, at the accessory device, receiving a first transmission energy for wireless charging from an electronic device; in accordance with receiving the first transmission energy: setting a timer, and entering a docked mode; and exiting the docked mode upon expiration of the timer.

20 Claims, 5 Drawing Sheets

(56) References Cited

OTHER PUBLICATIONS

First Office Action received for Chinese Application No. 202080069060.2, mailed on May 13, 2025, 13 pages. (English Translation Provided).

* cited by examiner

SYSTEMS AND METHODS FOR WIRELESS CHARGER DOCKING

CROSS REFERENCE TO RELATED APPLICATIONS

This application is a continuation of U.S. patent application Ser. No. 17/765,419, filed Mar. 30, 2022, which is a U.S. National Stage Application of Patent Cooperation Treaty International Application No. PCT/US2020/053332, filed Sep. 29, 2020, which claims priority to and the benefit of the Netherlands Patent Application No. NL2023919, filed Sep. 30, 2019, which are all incorporated herein by reference in their entireties.

BACKGROUND

Background and Relevant Art

Wireless electronic devices provide users improved levels of freedom while remaining connected to personal and professional communications. Wireless accessory devices allow more efficient interactions with communications and other electronic devices. However, even electronic and accessory devices intended to be used wirelessly conventionally require wired charging of an internal power supply. Wireless charging techniques are becoming more common, but exhibit lower power transmission performance, lower charging performance, slower data transmission, and other shortcomings relative to wired charging and data transfer.

BRIEF SUMMARY

In some embodiments, a user places an accessory device in proximity to an electronic dock to wirelessly charge the accessory device, wirelessly transfer data to the accessory device, or both. The user does not use the accessory device while the accessory device is connected to or resting on a wireless charging dock. In some embodiments, the accessory device enters a docked mode upon receiving a wireless transmission energy from the dock. In some embodiments, the docked mode decreases the power consumption of the electronic components of the accessory device while on the dock. In some embodiments, the docked mode disables one or more communication devices of the accessory device to reduce interference with other nearby electronic devices. In some embodiments, the docked mode disables one or more output functions of the accessory device to limit unintended inputs to the accessory device or associated electronic device. In some embodiments, the docked mode enables one or more input components of the accessory device to enable inputs to the accessory device or associated electronic device while the accessory device is docked.

In some embodiments, a method of docking an accessory device includes, at the accessory device, receiving a first transmission energy for wireless charging from a dock, setting a timer upon receiving the first transmission energy, entering a docked mode, and exiting the docked mode upon expiration of the timer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to devices, systems, and methods for docking an accessory device on a wireless charger. In some embodiments, the wireless charger is part of a dock integrated into another electronic device, such as a peripheral dock on a laptop computer. In some embodiments, the wireless charger is a dedicated dock for the accessory device, such as a charging cradle for a remote control.

The methods, devices, and systems described herein, in some embodiments, improve the charging performance or operational reliability of the accessory device while positioned on the dock by entering the accessory device into a docked mode. In some embodiments, a user docks an accessory device on another electronic device to charge the accessory device or to transmit data between the electronic device and the accessory device. In some embodiments, the dock includes a transmitter that produces an electromagnetic field. The electromagnetic field of the dock can magnetically couple the transmitter to a receiver of the accessory device to induce an electric current in the receiver of the accessory device. In some embodiments, the dock includes a transmission source that produces an optical energy that transmits energy to a photovoltaic in the accessory device. In some embodiments, the dock includes a transmission source that produces an acoustic energy that transmits energy through vibration (i.e., compression waves) to a receiver or membrane in the accessory device. In some embodiments, the dock includes a transmitter that produces a varying electric field to capacitively couple the dock to the accessory device.

Figure 1:
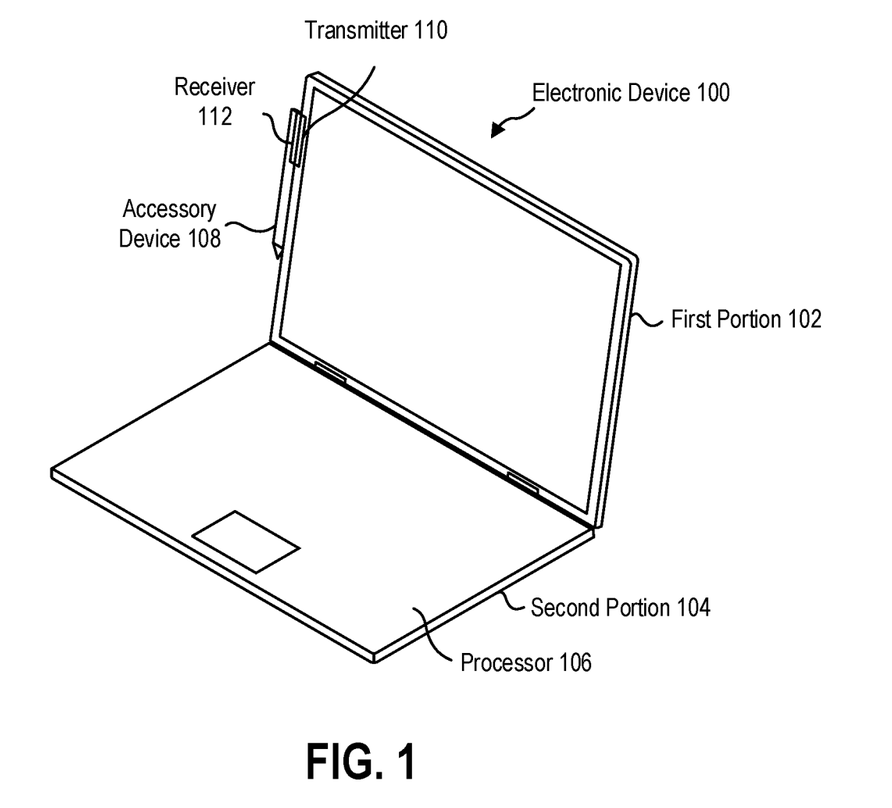
FIG. 1 is a perspective view of an electronic device with an accessory device docked thereon, according to at least one embodiment of the present disclosure.

FIG. 1 is a perspective view of an embodiment of an electronic device 100 with an accessory device 108 docked thereto. The electronic device 100 illustrated in FIG. 1 is a laptop computer having a first portion 102 and a second portion 104 that are movable relative to one another, and the accessory device 108 is a stylus that pairs with the electronic device to provide inputs and inking functionality.

In some embodiments, a processor 106 of the electronic device 100 is located in the second portion 104 and is in data communication with a transmitter 110 located in the first portion 102. When the accessory device 108 is positioned in proximity to the transmitter 110, a receiver 112 receives a transmission energy from the transmitter 110, and the accessory device 108 enters a docked mode. In the illustrated embodiment, the bezel of the first portion 102 that contains the transmitter 110 acts as the dock for the accessory device 108. In some embodiments, the dock includes a retention mechanism, such as a mechanical retention mechanism, a magnetic retention mechanism, or an adhesive retention mechanism, to hold the accessory device 108 in proximity to the dock. In some embodiments, the dock is oriented such that gravity holds the accessory device 108 in proximity to the dock.

When the accessory device 108 is docked, one or more components or features of the accessory device 108 may not be used. In some embodiments, the charging of the accessory device 108 via the dock is improved while docked by disabling one or more components or features that consumes power from the accessory device power supply. For example, a computer mouse can be docked on a wireless charging pad to charge the mouse between use sessions. The computer mouse, while docked, cannot provide meaningful inputs to a computing device, so a communication device (e.g., a BLUETOOTH communication device) can be disabled to reduce power consumption and allow charging from the dock to be more efficient. Moreover, for an optical mouse, the optical sensor circuitry may also be disabled to further reduce power consumption.

In some embodiments, the accessory device is a wearable device, such as a smartwatch. In some embodiments, a wearable device has a relatively small or no display and communicates data to another computing device to display data collected by the smartwatch. In at least some embodiments, a wearable device, such as a pedometer, disables a data communication component and/or a sensor component to conserve power.

In some embodiments, the accessory device operates in a docked mode (e.g., a low power mode) while it is docked, without regard to whether it is currently charging. For example, a fully charged accessory device may cease to charge while in the dock but continues to operate in the docked mode to prevent unintended outputs and to better maintain the charged state.

Figure 2:
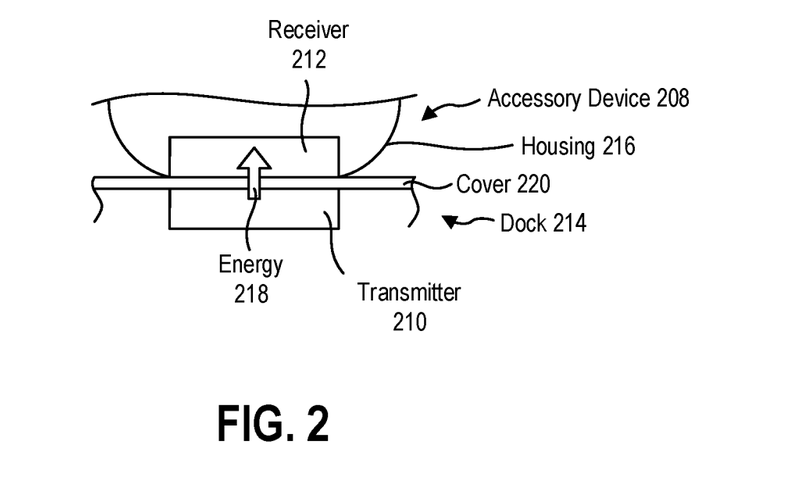
FIG. 2 is a side view of an accessory device positioned on a dock, according to at least one embodiment of the present disclosure.

FIG. 2 is a side view of another embodiment of an accessory device 208 resting on a dock 214. In some embodiments, the accessory device 208 has a housing 216, with the receiver 212 positioned at or near a surface of the housing 216. The receiver 212 is positioned proximate a transmitter 210 of the dock 214, such that a transmission energy 218 is transmitted to the receiver 212.

In some embodiments, the transmission energy 218 is transmitted through one or more parts of the accessory device 208 and/or dock 214 en route to the receiver 212. In some embodiments, the housing 216 of the accessory device 208 and/or a cover 220 of the dock 214 are at least partly transparent to the transmission energy 218. In the illustrated embodiment with a transmitter 210 that generates an electromagnetic field, the cover 220 is a non-magnetic material to allow the transmission energy 218 to pass through the cover 220 to the receiver 212.

In some embodiments, the transmission energy 218 is an optical energy, where the dock 214 includes an optical energy source (e.g., light emitting diode(s)), the cover 220 is optically transparent, and the accessory device 208 includes a photovoltaic panel to receive the transmission energy 218.

The accessory device may have one or more features or components that allow a user to provide user inputs to the accessory device and/or an electronic device in data communication with the accessory device. In some embodiments, an input component of the accessory device is disabled to prevent unintended inputs from a user while the accessory device is docked.

In some embodiments, the accessory device is a stylus, such as described in relation to FIG. 1. The tip of the stylus may detect contact and/or proximity of the tip with a surface to communicate inking user inputs to an electronic device. In some embodiments, the stylus detects the display proximity and broadcasts a wireless signal into the screen. The touch display module in the display then determines stylus tip location. In other examples, the stylus includes one or more buttons on the stylus that a user presses to provide user inputs. In some embodiments, one or more of the buttons are disabled while docking to prevent accidentally activation.

In some embodiments, the accessory device is the computing mouse described herein. The buttons of the mouse may be disabled such that depressing the buttons does not register a user input. A ball, an optical sensor, a laser sensor, or other movement detection mechanism of the computer mouse may be disabled such that movement of the computer mouse relative to a surface upon which the computer mouse is positioned is not registered as a user input.

In some embodiments, the accessory device is a keyboard. The buttons of the keyboard may be disabled such that depressing the buttons does not register a user input. A trackpad, thumb stick, or other directional input mechanism of the keyboard may be disabled such that contact with or force applied to the directional input mechanism is not registered as a user input while the keyboard is in a docked mode. In some embodiments, the docked mode enables keystroke inputs to allow the user to input commands to the keyboard and associated electronic device while the keyboard is docked.

In some embodiments, the accessory device is a touch-sensitive device. The touch-sensitive surface may be disabled such that contacting the touch-sensitive surface does not register a user input. A track pad, touchscreen, other capacitive touch-sensitive surface, other resistive touch-sensitive surface, or other touch-sensitive input mechanism may be disabled such that contact with or force applied to the touch-sensitive surface is not registered as a user input while the touch-sensitive device is in a docked mode.

In some embodiments, an output component of the accessory device is disabled to save power and/or prevent unintended outputs while the accessory device is docked. An unintended output may confuse a user and/or communicate erroneous information.

In some embodiments, the accessory device is an audio device, such as a wireless speaker, headphones, earphones, or other audio device capable of generating audio signals to communicate with a user. In these embodiments, the audio device speaker(s) may be disabled while the audio device is in the docked mode. Conversely, in accordance with some embodiments, a wireless speaker may be allowed to operate at a higher power level while in the docked mode.

In some embodiments, an audio device that is docked with another electronic device may experience radio frequency (RF) signals or interference from the electronic device. For example, a speaker docked with an electronic device may be located in proximity to a wireless communication antenna of the electronic device. In some examples, the dock of the electronic device may utilize RF signals to communicate with the docked speaker. The RF signals provided by the electronic device can interfere with the production of audio signals by the speaker. As such, a speaker may disable a speaker driver or other audio component of the speaker while docked.

In some embodiments, the electronic device is a computing device, including but not limited to a laptop computer, hybrid computer, foldable computer, tablet computer, smartphone, wearable computing device, or other computing device. In some embodiments, the electronic device includes a dock that contains a transmitter. The transmitter can send a transmission energy from the dock to the accessory device. When a transmission current is applied to the transmitter in the dock, the transmitter generates an electromagnetic field that extends beyond an outer surface of the dock. A receiver positioned within the electromagnetic field proximate the dock experiences the electromagnetic field. A varying electromagnetic field induces a current in the receiver. In some embodiments, the transmitter produces a RF signal in the near field communication (NFC) frequency range. In some embodiments, the coils are configured to implement a wireless charging protocol, such as those defined by the NFC and Qi standards.

In some embodiments, the transmitter transmits energy from the transmitter to the receiver to wirelessly charge a power supply of the accessory device. In some embodiments, the power supply is a battery. In some embodiments, the power supply is a capacitor. In some embodiments, the transmitter modulates the transmission energy from the transmitter to the receiver to communicate data from the dock and/or electronic device to the accessory device.

As used herein, an accessory device is considered to be "docked" when receiving sufficient transmission energy from a transmission coil to charge the accessory device. The electronic device may or may not include a mechanical dock for the accessory device. For example, the accessory device may be considered to be docked when placed on a flat charging pad component or magnetically coupled to a surface of the electronic device.

Figure 3:
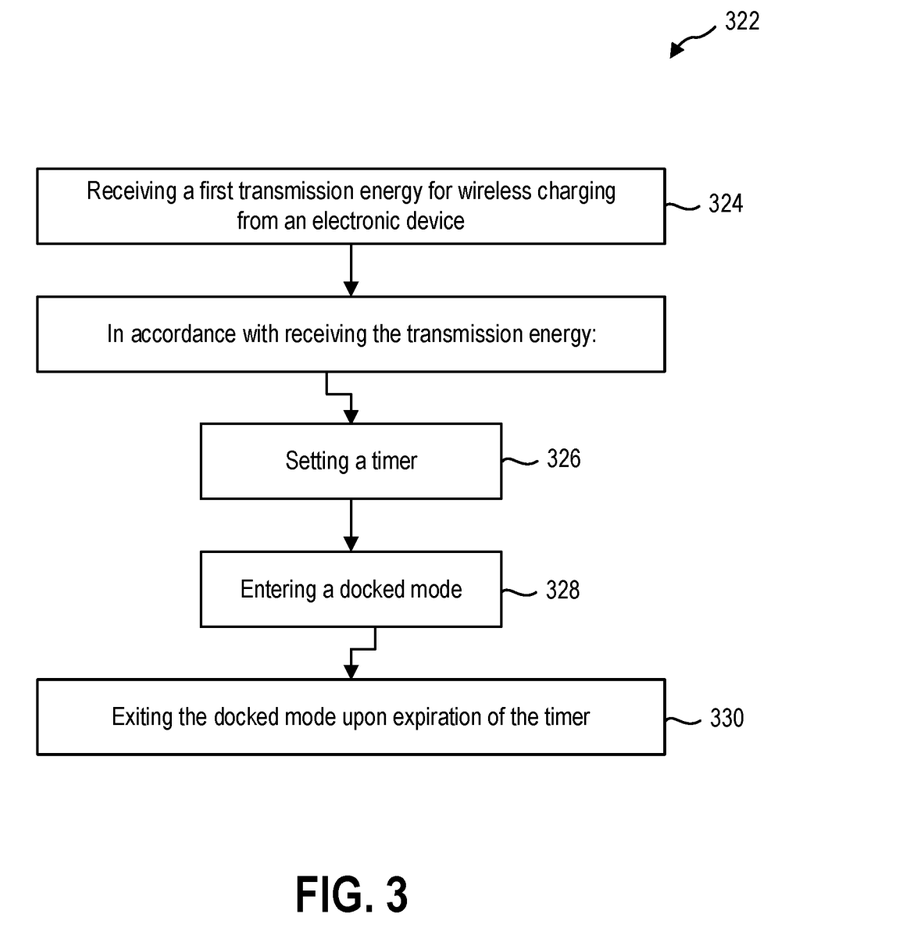
FIG. 3 is a flowchart of a method of docking an accessory device, according to at least one embodiment of the present disclosure.

While docked, the wireless transmission of charging power and/or data to the accessory device may be improved by disabling one or more components and/or features of the accessory device. In order to adjust the performance of the accessory device, the accessory device determines when the accessory device is docked and undocked in accordance with some embodiments. FIG. 3 is a flowchart illustrating a method (322) of docking an accessory device in accordance with some embodiments. In some embodiments, a method of docking an accessory device includes, at the accessory device, receiving (324) a first transmission energy for wireless charging from a dock. In some embodiments, the first transmission energy is an electromagnetic field. In some embodiments, the first transmission energy is an optical energy. In some embodiments, the first transmission energy is an acoustic energy that transmits energy through vibration (i.e., compression waves) to a receiver or membrane in the accessory device. In some embodiments, the first transmission energy is a varying electric field to capacitively couple the dock to the accessory device. In some embodiments, the accessory device determines whether the first transmission energy meets one or more criteria (e.g., is of sufficient magnitude to establish charging) and determines the accessory device is docked in accordance with a determination that the first transmission energy meets the one or more criteria. In some embodiments, the accessory device modulates the first transmission energy to communicate with the electronic device. In some embodiments, the accessory device determines that it is docked in accordance with receiving a response from the electronic device to the modulated first transmission energy.

In some embodiments, when the accessory device receives the first transmission energy for wireless charging from the dock, the accessory device is determined to be docked and the method includes setting (326) a timer upon receiving the first transmission energy and entering (328) a docked mode. The method includes the accessory device exiting (330) the docked mode when the timer expires. In some embodiments, the docked mode is a sleep mode of the accessory device. In some embodiments, the accessory device is a smartphone and the docked mode is an airplane mode that disables or modifies one or more communication components. In some embodiments, the docked mode is a low-power mode with one or more components operating at a lower power consumption. In some embodiments, the docked mode is a high-power mode with one or more components operating a full capacity.

In some embodiments, the timer is set for a first duration upon receiving the first transmission energy. For example, the first duration is in a range having an upper value, a lower value, or upper and lower values including any of 10 milliseconds (ms), 50 ms, 100 ms, 150 ms, 200 ms, 250 ms, 300 ms, 400 ms, 500 ms, 750 ms, 1 second (s), 1.25 s, 1.5 s, 2.0 s or any values therebetween. In some embodiments, the first duration of the timer is greater than 10 ms. In some embodiments, the first duration of the timer is less than 2.0 s. In some embodiments, the first duration of the timer is less than 1.0 s. In some embodiments, the first duration of the timer is between 10 ms and 2.0 s. In some embodiments, the first duration of the timer is between 50 ms and 1.0 s. In some embodiments, the first duration of the timer is between 100 ms and 500 ms. In some embodiments, the first duration of the timer is about 250 ms.

The accessory device remains in the docked mode while the timer runs. Upon expiration of the timer, the accessory device exits the docked mode. In some embodiments, the accessory device receives a second transmission energy from the dock before the timer expires. After receiving the second transmission, the accessory device resets the timer.

Figure 4:
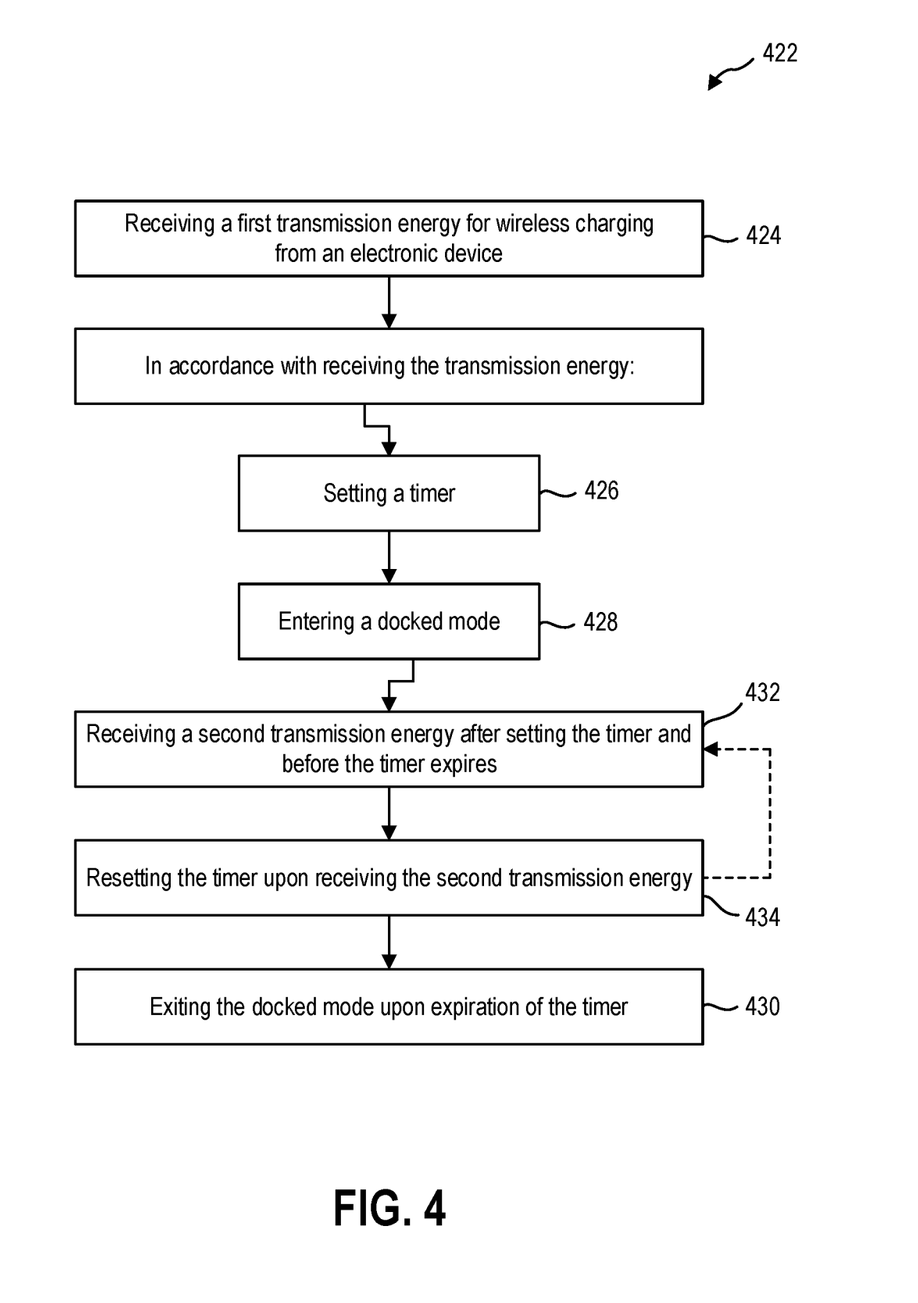
FIG. 4 is a flowchart of another method of docking an accessory device, according to at least one embodiment of the present disclosure.

FIG. 4 is a flowchart illustrating a method (422) in which the accessory device resets the timer upon receiving a second transmission energy in accordance with some embodiments. In some embodiments, the method includes, at the accessory device, receiving (424) a first transmission energy for wireless charging from a dock, setting (426) a timer upon receiving the first transmission energy, entering (428) a docked mode, and exiting (430) the docked mode when the timer expires, similar to the method (322) described in relation to FIG. 3. The method of FIG. 4 further includes, while in the docked mode, receiving (432) a second transmission energy after setting the timer and before the timer expires and resetting (434) the timer upon receiving the second transmission energy. In some embodiments, the method includes receiving a series of transmission energies and resetting the timer each time to keep the accessory device in the docked mode. When the transmission energy is not detected for a length of time equal to the duration of the timer, the timer expires without resetting, and the accessory device exits the docked mode.

In some embodiments, the second transmission energy is the same as the first transmission energy. In some embodiments, the first transmission energy is a first transmission current applied to the transmitter for a first length of time. In some embodiments, the second transmission energy has the same magnitude and/or length as the first transmission energy. In some embodiments, the second transmission energy has a different magnitude from the first transmission energy. In some embodiments, the second transmission energy has a different length that the first transmission energy.

In some embodiments, the first transmission energy is an analog ping that is used by the transmitter and/or dock to detect the presence of a metallic object in proximity to the transmitter, and the second transmission energy is a digital ping including modulations that provide data communication with a chargeable accessory device. In such embodiments, the accessory device receives the analog ping, enters a docked mode, and sets a timer with a first duration. Upon receiving the digital ping, the accessory device resets the timer and remains in the docked mode.

In some embodiments, the first transmission energy is a ping that is used by the transmitter and/or dock to detect the presence or confirm the identity of a metallic object in proximity to the transmitter, and the second transmission energy is a charging energy to charge a chargeable accessory device. In such embodiments, the accessory device receives a ping, enters a docked mode, and sets a timer with a first duration. Upon receiving the charging energy, the accessory device resets the timer and remains in the docked mode.

In some embodiments, resetting the timer includes resetting the timer to the first duration. In at least one example, the first duration of the timer is 250 ms. If the second transmission energy is received within 250 ms of beginning the timer, the timer is reset to 250 ms. When the accessory device does not receive a transmission energy from the dock for 250 ms or more, the accessory device exits the docked mode.

In some embodiments, resetting the timer includes resetting the timer to a second duration that is different from the first duration. In some embodiments, the second duration is shorter than the first duration. In some examples, the first duration is longer than the second duration if the transmitter changes transmission currents (e.g., the current in the transmitter) from the first transmission energy to the second transmission energy, causing a delay between transmission energies. In some embodiments, each subsequent second transmission energy is spaced apart by a consistent time gap (e.g., period), and the second duration is different from the first duration to reflect the period of the second transmission energy. In some embodiments, the second duration is longer than the first duration. In at least one example, the first duration of the timer is 250 ms. If the second transmission energy is received within 250 ms of beginning the timer, the timer is reset to 250 ms.

In some embodiments, the timer duration is twice the time gap or period of the transmission energy pulse. For example, in a series of pulses with a period of 100 ms, the timer duration is set to 200 ms. RF Interference or another transmission or receiving issue can result in a failure to detect a transmission energy pulse. A timer duration that is at least twice the time gap or period of the transmission energy pulse allows the accessory device to remain in a docked mode through a missed transmission energy pulse without exiting the docked mode. In some embodiments, as long as the accessory device continues to receive the transmission energy before the timer expires, the timer will continue to reset and the accessory device remains in the docked mode.

In some embodiments, the docked mode of the accessory device alters the operation of the accessory device. For example, a stylus may have a variety of active features and/or components while a user is using the stylus to provide inputs to an electronic device, such as inking on a display of the electronic device using the stylus. The docked mode alters the operation of the accessory device by disabling or altering the operational power of one or more components of the accessory device, such as disabling a wireless signal from the stylus when the stylus is positioned in proximity to the display.

Figure 5:
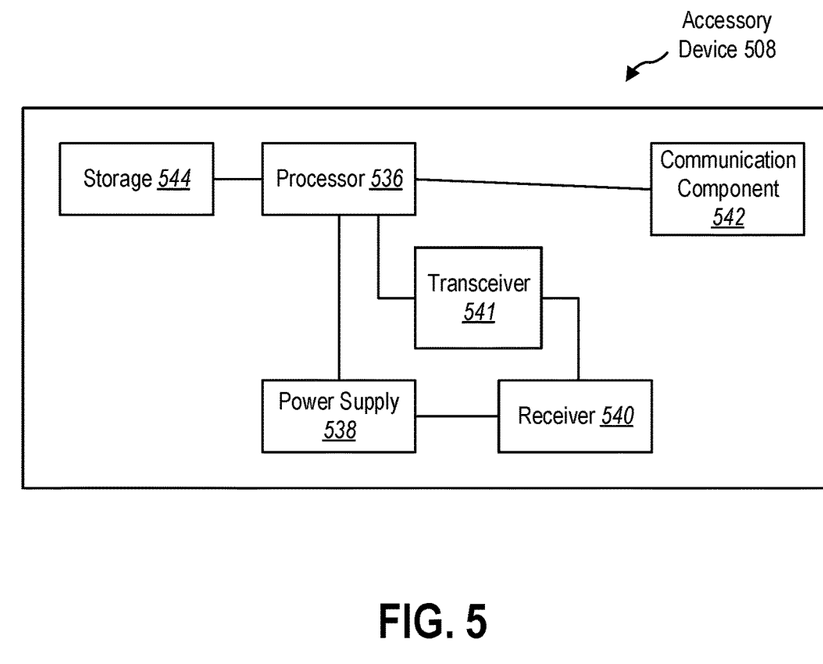
FIG. 5 is a system diagram of an accessory device, according to at least one embodiment of the present disclosure.
Figure 6:
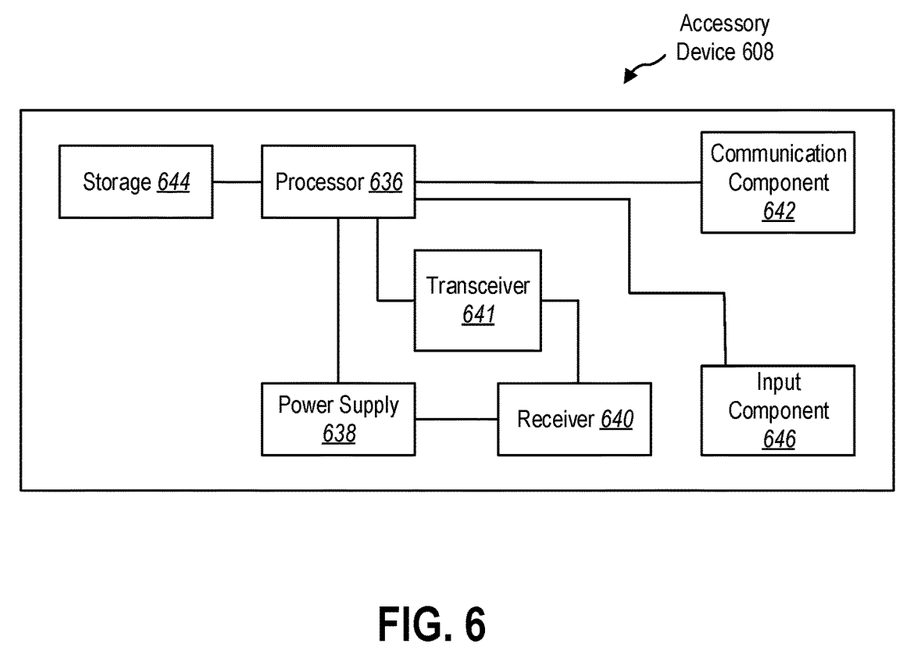
FIG. 6 is a system diagram of another accessory device, according to at least one embodiment of the present disclosure.
Figure 7:
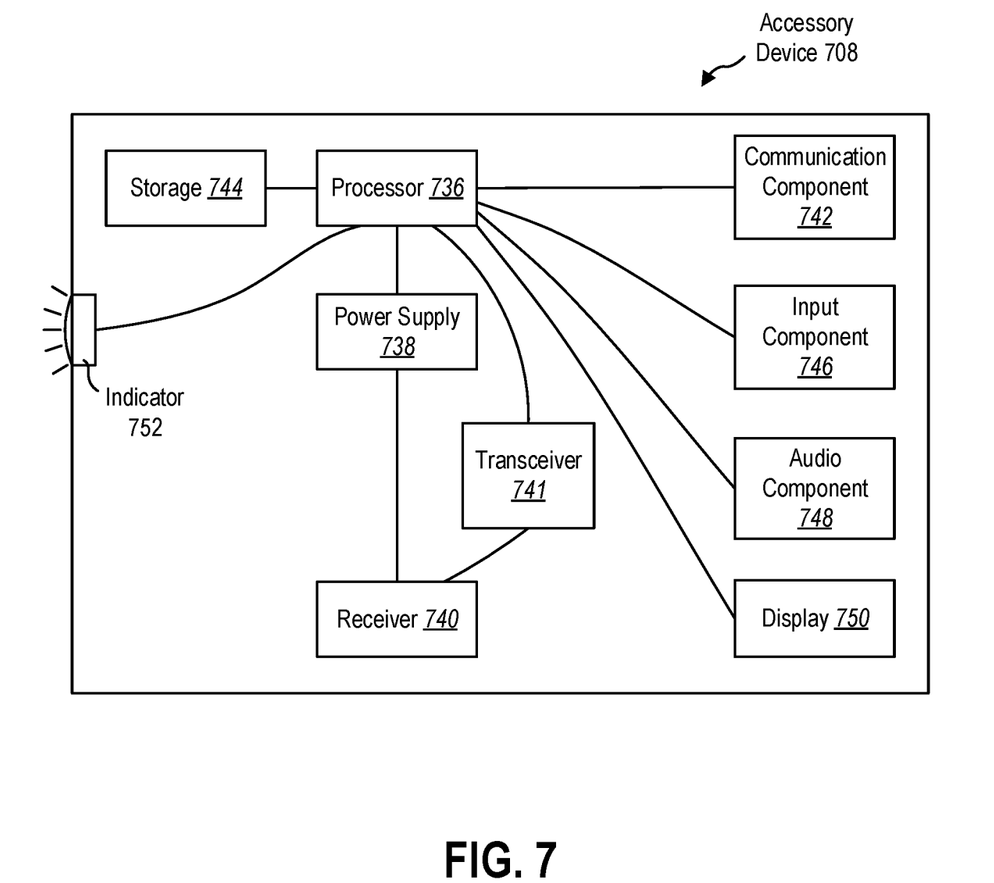
FIG. 7 is a system diagram of yet another accessory device, according to at least one embodiment of the present disclosure.

FIG. 5 through FIG. 7 are system diagrams that schematically illustrate different embodiments of accessory devices. In some embodiments, the docked mode alters the operation of the accessory device. In some embodiments, while in the docked mode, the accessory device disables one or more features or components of the accessory device that consumes power, transmits data, receives inputs, or could interfere with the dock or electronic device.

Referring now to FIG. 5, in some embodiments, the accessory device 508 includes one or more electrical components that are not used while the accessory device is docked. In some embodiments, the accessory device 508 includes a processor 536 in communication with a power supply 538 and with a NFC receiver 540 via a NFC transceiver 541. The processor 536 is further in communication with a communication device 542. In some embodiments, disabling an electrical component, such as the communication device 542, or reducing the power of the electrical component reduces consumption from the accessory device power supply 538, allowing the power supply 538 to charge faster while the accessory device 508 is docked and receiving power through the NFC receiver 540.

In some embodiments, the accessory device 508 includes a hardware storage device 544 in data communication with the processor 536. In some embodiments, the hardware storage device 544 includes instructions stored thereon that, when executed by the processor 536, cause the processor 536 to perform any of the methods described herein. In some embodiments, the hardware storage device 544 is a solid-state hardware storage device. In some embodiments, the hardware storage device 544 is a platen-based storage device. In some embodiments, the hardware storage device 544 is an optical disk drive.

Referring now to FIG. 6, in some embodiments, the accessory device 608 includes one or more input components 646 that can potentially cause unintentional user inputs to the accessory device 608. In some embodiments, the accessory device 608 includes a processor 636 in communication with a power supply 638 and with a NFC receiver 640 via a NFC transceiver 641. The processor 636 is further in communication with a communication device 642 and a hardware storage device 644.

In some embodiments, the accessory device 608 is in data communication with an electronic device, and the accessory device 608 includes one or more input components 646 that can potentially cause unintentional user inputs to the electronic device. In some embodiments, disabling the input component 646 or reducing the power of the input component 646 reduces the potential of an unintended input to the accessory device 608 and/or an electronic device while the accessory device 608 is docked.

Referring now to FIG. 7, in some embodiments, the accessory device 708 includes one or more output components (e.g., audio device 748; display 750) that can potentially cause interference with the dock or electronic device and/or the output components can potentially receive interference and unintentionally output signals to a user. In some embodiments, the accessory device 708 includes a processor 736 in communication with a power supply 738 and with a NFC receiver 740 via a NFC transceiver 741. The processor 736 is further in communication with a communication device 742 and a hardware storage device 744. In some embodiments, the processor 736 disables the audio device 748 and/or the display 750 while in the docked mode. Disabling the output components limits the potential for unintended outputs and can reduce power consumption while docked and charging.

In some embodiments, disabling the output component(s) or reducing the power of the output component(s) reduces the potential of an unintended output from the accessory device 708 and/or an electronic device while the accessory device is docked.

In some embodiments, enabling an output component, such illuminating an indicator 752, of the accessory device upon entering docked mode allows a user to confirm when the accessory device is docked. In some embodiments, enabling an output component while charging in docked mode, such illuminating an indicator 752, allows a user to confirm when the accessory device is docked and charging. In some embodiments, the indicator turns off when the accessory device finishes charging while the accessory device remains in docked mode.

In some embodiments, the feature or component of the accessory device that is disabled or operated at a reduced power while in the docked mode is enabled or operated at full power upon exiting the docked mode. In an example of a stylus docked and charging on a laptop, when the timer expires and the stylus exits the docked mode, a communication device of the stylus is enabled, allowing data communication between the stylus and the laptop.

INDUSTRIAL APPLICABILITY

The present disclosure relates generally to systems and methods for docking an accessory device on a wireless charger. In some embodiments, an accessory device is docked to another electronic device. The electronic device may be a dedicated dock for the accessory device. In some examples, the electronic device is a cradle for the accessory device that provides charging or other communication with the accessory device. In other examples, the electronic device has a dock therein or thereon, and the electronic device has additional functionality.

In some embodiments, a user docks an accessory device on another electronic device to charge the accessory device or to transmit data between the electronic device and the accessory device. In some embodiments, the dock includes a transmitter that produces an electromagnetic field. The electromagnetic field of the dock can magnetically couple the transmitter to a receiver of the accessory device to induce an electric current in the receiver of the accessory device. In some embodiments, the dock includes a transmission source that produces an optical energy that transmits energy to a photovoltaic in the accessory device. In some embodiments, the dock includes a transmission source that produces an acoustic energy that transmits energy through vibration (i.e., compression waves) to a receiver or membrane in the accessory device. In some embodiments, the dock includes a transmitter that produces a varying electric field to capacitively couple the dock to the accessory device.

When the accessory device is docked, one or more components or features of the accessory device may not be used. In some embodiments, the charging of the accessory device is improved while docked by disabling one or more components or features that consumes power from the accessory device power supply. For example, a computer mouse can be docked on a wireless charging pad to charge the mouse between use sessions. The computer mouse, while docked, cannot provide meaningful inputs to a computing device, so a communication device (e.g., a BLUETOOTH communication device) can be disabled to reduce power consumption and allow charging from the dock to be more efficient.

In some embodiments, the accessory device is a wearable device, such as a smartwatch. In some embodiments, a wearable device has a relatively small or no display and communicates data to another computing device to display data collected by the smartwatch. In at least some embodiments, a wearable device, such as a pedometer, disables a data communication device to save power.

In some embodiments, an input component of the accessory device is disabled to prevent unintended inputs from a user while the accessory device is docked. The accessory device may have one or more features or components that allow a user to provide user inputs to the accessory device and/or an electronic device in data communication with the accessory device.

In some embodiments, the accessory device is a stylus. The tip of the stylus may detect contact and/or proximity of the tip with a surface to communicate inking user inputs to an electronic device. In other examples, the stylus includes one or more buttons on the stylus that a user presses to provide user inputs.

In some embodiments, the accessory device is the computing mouse described herein. The buttons of the mouse may be disabled such that depressing the buttons does not register a user input. A ball, optical sensor, laser sensor, or other movement detection mechanism of the computer mouse may be disabled such that movement of the computer mouse relative to a surface upon which the computer mouse is positioned is not registered as a user input.

In some embodiments, the accessory device is a keyboard. The buttons of the keyboard may be disabled such that depressing the buttons does not register a user input. A trackpad, thumb stick, or other directional input mechanism of the keyboard may be disabled such that contact with or force applied to the directional input mechanism is not registered as a user input while the keyboard is in a docked mode. In some embodiments, the docked mode enables keystroke inputs to allow the user to input commands to the keyboard and associated electronic device while the keyboard is docked.

In some embodiments, the accessory device is a touch-sensitive device. The touch-sensitive surface may be disabled such that contacting the touch-sensitive surface does not register a user input. A track pad, touchscreen, other capacitive touch-sensitive surface, other resistive touch-sensitive surface, or other touch-sensitive input mechanism may be disabled such that contact with or force applied to the touch-sensitive surface is not registered as a user input while the touch-sensitive device is in a docked mode.

In some embodiments, an output component of the accessory device is disabled to save power and/or prevent unintended outputs while the accessory device is docked. An unintended output may confuse a user or unintentionally communicate false information. In some embodiments, the accessory device is an audio device, such as a wireless speaker, headphones, earphones, or other audio device capable of generating audio signals to communicate with a user.

In some embodiments, an audio device that is docked with another electronic device may experience RF signals or interference from the electronic device. For example, a speaker docked with an electronic device may be located in proximity to a wireless communication antenna of the electronic device. In some examples, the dock of the electronic device may utilize RF signals to communicate with the docked speaker. The RF signals provided by the electronic device can interfere with the production of audio signals by the speaker. As such, a speaker may disable a speaker driver or other audio component of the speaker while docked.

In some embodiments, the electronic device is a computing device, including but not limited to a laptop computer, hybrid computer, foldable computer, tablet computer, smartphone, wearable computing device, or other computing device. In some embodiments, the electronic device includes a dock that contains a transmitter. The transmitter can send a transmission energy from the dock to the accessory device. When a transmission current is applied to the transmitter in the dock, the transmitter generates an electromagnetic field that extends beyond an outer surface of the dock. A receiver positioned within the electromagnetic field proximate the dock experiences the electromagnetic field. A varying electromagnetic field induces a current in the receiver. In some embodiments, the transmitter produces a RF signal in the near field communication (NFC) frequency range.

In some embodiments, the transmitter transmits energy from the transmitter to the receiver to wirelessly charge a power supply of the accessory device. In some embodiments, the power supply is a battery. In some embodiments, the power supply is a capacitor. In some embodiments, the transmitter modulates the transmission energy from the transmitter to the receiver to communicate data from the dock and/or electronic device to the accessory device.

While docked, the wireless transmission of charging power and/or data to the accessory device may be improved by disabling one or more components and/or features of the accessory device. In order to adjust the performance of the accessory device, the accessory device determines when the accessory device is docked and undocked. In some embodiments, a method of docking an accessory device includes, at the accessory device, receiving a first transmission energy for wireless charging from a dock. In some embodiments, the first transmission energy is an electromagnetic field. In some embodiments, the first transmission energy is an optical energy. In some embodiments, the first transmission energy is an acoustic energy that transmits energy through vibration (i.e., compression waves) to a receiver or membrane in the accessory device. In some embodiments, the first transmission energy is a varying electric field to capacitively couple the dock to the accessory device.

In some embodiments, when the accessory device receives the first transmission energy for wireless charging from the dock, the accessory device is determined to be docked and the method includes setting a timer upon receiving the first transmission energy and entering a docked mode. The accessory device remains in the docked mode until the timer expires. In some embodiments, the docked mode is a sleep mode of the accessory device. In some embodiments, the accessory device is a smartphone and the docked mode is an airplane mode that disables or modifies one or more communication components. In some embodiments, the docked mode is a lower power mode with one or more components operating at a lower power consumption. In some embodiments, the docked mode is a high-power mode with one or more components operating a full capacity.

In some embodiments, the timer is set for a first duration upon receiving the first transmission energy. For example, the first duration is in a range having an upper value, a lower value, or upper and lower values including any of 10 milliseconds (ms), 50 ms, 100 ms, 150 ms, 200 ms, 250 ms, 300 ms, 400 ms, 500 ms, 750 ms, 1 second (s), 1.25 s, 1.5 s, 2.0 s or any values therebetween. In some embodiments, the first duration of the timer is greater than 10 ms. In some embodiments, the first duration of the timer is less than 2.0 s. In some embodiments, the first duration of the timer is less than 1.0 s. In some embodiments, the first duration of the timer is between 10 ms and 2.0 s. In some embodiments, the first duration of the timer is between 50 ms and 1.0 s. In some embodiments, the first duration of the timer is between 100 ms and 500 ms. In some embodiments, the first duration of the timer is about 250 ms.

The accessory device remains in the docked mode while the timer runs. Upon expiration of the timer, the accessory device exits the docked mode. In some embodiments, the accessory device receives a second transmission energy from the dock before the timer expires. After receiving the second transmission, the accessory device resets the timer.

In some embodiments, the second transmission energy is the same as the first transmission energy. In some embodiments, the first transmission energy is a first transmission current applied to the transmitter for a first length of time. In some embodiments, the second transmission energy has the same magnitude and/or length as the first transmission energy. In some embodiments, the second transmission energy has a different magnitude from the first transmission energy. In some embodiments, the second transmission energy has a different length that the first transmission energy.

In some embodiments, the first transmission energy is an analog ping that is used by the transmitter and/or dock to detect the presence of a metallic object in proximity to the transmitter, and the second transmission energy is a digital ping including modulations that provide data communication with a chargeable accessory device. In such embodiments, the accessory device receives the analog ping, enters a docked mode, and sets a timer with a first duration. Upon receiving the digital ping, the accessory device resets the timer and remains in the docked mode.

In some embodiments, the first transmission energy is a ping that is used by the transmitter and/or dock to detect the presence or confirm the identity of a metallic object in proximity to the transmitter, and the second transmission energy is a charging energy to charge a chargeable accessory device. In such embodiments, the accessory device receives a ping, enters a docked mode, and sets a timer with a first duration. Upon receiving the charging energy, the accessory device resets the timer and remains in the docked mode.

In some embodiments, resetting the timer includes resetting the timer to the first duration. In at least one example, the first duration of the timer is 250 ms. If the second transmission energy is received within 250 ms of beginning the timer, the timer is reset to 250 ms. When the accessory device does not receive a transmission energy from the dock for 250 ms or more, the accessory device exits the docked mode.

In some embodiments, resetting the timer includes resetting the timer to a second duration that is different from the first duration. In some embodiments, the second duration is shorter than the first duration. In some examples, the first duration is longer than the second duration if the transmitter changes transmission currents (e.g., the current in the transmitter) from the first transmission energy to the second transmission energy, causing a delay between transmission energies. In some embodiments, each subsequent second transmission energy is spaced apart by a consistent time gap (e.g., period), and the second duration is different from the first duration to reflect the period of the second transmission energy. In some embodiments, the second duration is longer than the first duration. In at least one example, the first duration of the timer is 250 ms. If the second transmission energy is received within 250 ms of beginning the timer, the timer is reset to 250 ms.

In some embodiments, the timer duration is twice the time gap or period of the transmission energy pulse. For example, in a series of pulses with a period of 100 ms, the timer duration is set to 200 ms. RF Interference or another transmission or receiving issue can result in a failure to detect a transmission energy pulse. A timer duration that is at least twice the time gap or period of the transmission energy pulse allows the accessory device to remain in a docked mode through a missed transmission energy pulse without exiting the docked mode. In some embodiments, as long as the accessory device continues to receive the transmission energy before the timer expires, the timer will continue to reset and the accessory device remains in the docked mode.

In some embodiments, the docked mode of the accessory device alters the operation of the accessory device. For example, a stylus may have a variety of active features and/or components while a user is using the stylus to provide inputs to an electronic device, such as inking on a display of the electronic device using the stylus. The docked mode alters the operation of the accessory device by disabling or altering the operational power of one or more components of the accessory device.

In some embodiments, the docked mode alters the operation of the accessory device. In some embodiments, while in the docked mode, the accessory device disables one or more features or components of the accessory device that consumes power, transmits data, receives inputs, or could interfere with the dock or electronic device.

In some embodiments, the accessory device includes one or more electrical components that are not used while the accessory device is docked. In some embodiments, disabling an electrical component, such as a data communication device, or reducing the power of the electrical component reduces consumption from the accessory device power supply, allowing the power supply to charge faster while the accessory device is docked.

In some embodiments, the accessory device includes one or more input components that can potentially cause unintentional user inputs to the accessory device. In some embodiments, the accessory device is in data communication with an electronic device, and the accessory device includes one or more input components that can potentially cause unintentional user inputs to the electronic device. In some embodiments, disabling the input component or reducing the power of the input component reduces the potential of an unintended input to the accessory device and/or an electronic device while the accessory device is docked.

In some embodiments, the accessory device includes one or more input components that can potentially cause unintentional user inputs to the accessory device. In some embodiments, the accessory device is in data communication with an electronic device, and the accessory device includes one or more input components that can potentially cause unintentional user inputs to the electronic device. In some embodiments, disabling the input component or reducing the power of the input component reduces the potential of an unintended input to the accessory device and/or an electronic device while the accessory device is docked.

In some embodiments, the feature or component of the accessory device that is disabled or operated at a reduced power while in the docked mode is enabled or operated at full power upon exiting the docked mode. In an example of a stylus docked and charging on a laptop, when the timer expires and the stylus exits the docked mode, a communication device of the stylus is enabled, allowing data communication between the stylus and the laptop.

The present disclosure relates to systems and methods for docking an accessory device on a wireless charger according to at least the examples provided in the sections below:

1. A method of docking an accessory device, the method comprising:
  at the accessory device (e.g., 108, FIG. 1; 208, FIG. 2; 508, FIG. 5; 608, FIG. 6; 708, FIG. 7):
    receiving (e.g., 324, FIG. 3) a first transmission energy for wireless charging from a dock;
    in accordance with receiving the first transmission energy:
      setting (e.g., 326, FIG. 3) a timer, and
      entering (e.g., 328, FIG. 3) a docked mode; and
    exiting (e.g., 330, FIG. 3) the docked mode upon expiration of the timer.

2. The method of section 1, wherein the docked mode is a sleep mode.

3. The method of section 1, wherein the docked mode is a low-power mode.

4. The method of section 1, wherein the docked mode is a high-power mode.

5. The method of any of sections 1-4 further comprising:
  receiving (e.g., 432, FIG. 4) a second transmission energy while in the docked mode, and
  resetting (e.g., 434, FIG. 4) the timer upon receiving the second transmission energy.

6. The method of section 5, wherein the first transmission energy and second transmission energy have different magnitudes.

7. The method of any of claims 1-6, wherein the docked mode modifies at least one communication function of the accessory device.

8. The method of any of claims 1-7, wherein the docked mode disables a radio frequency wireless communication device of the accessory device.

9. The method of any of claims 1-8, wherein the docked mode decreases a frequency of output communications of the accessory device.

10. The method of any of claims 1-9, wherein the docked mode modifies one or more output functions of the accessory device.

11. The method of any of sections 1-10, wherein the accessory device is a stylus (e.g., 108, FIG. 1) and the docked mode disables an inking function of the stylus.

12. The method of any of sections 1-10, wherein the accessory device is a smartphone and the docked mode is an airplane mode.

13. The method of any of sections 1-10, wherein the accessory device is a keyboard and the docked mode enables keystroke inputs.

14. The method of any of sections 1-10, wherein the accessory device is a speaker and the docked mode disables a speaker driver.

15. The method of any of claims 1-14, wherein the docked mode modifies one or more sensor functions of the accessory device.

16. The method of claim 15, wherein the accessory device is an optical mouse and the docked mode disables the optical sensor component.

17. The method of any of sections 1-16, wherein the timer is at least 250 milliseconds.

18. The method of any of sections 1-17, wherein the timer is less than 1 second.

19. The method of any of sections 1-18 further comprising receiving a second transmission energy at a time gap after receiving the first transmission energy, wherein the timer duration is twice the time gap.

20. The method of any of sections 1-19, wherein the first transmission energy has a near field communication transmission frequency.

21. The method of any of sections 1-20 further comprising illuminating an indicator upon entering docked mode.

22. The method of section 21 further comprising:
   charging a power supply of the accessory device from the dock, and
   illuminating an indicator while charging.

23. A non-transitory computer readable medium that, when executed by a processor, causes the processor to perform the method of any of sections 1-22.

24. An electronic accessory device, the accessory device comprising:
   a processor (e.g., 536, FIG. 5; 636, FIG. 6; 736, FIG. 7);
   a near-field communication receiver (e.g., 540, FIG. 5; 640, FIG. 6; 740, FIG. 7) in communication with the processor; and
   a hardware storage device (e.g., 544, FIG. 5; 644, FIG. 6; 744, FIG. 7) in communication with the processor, the hardware storage device having instructions stored thereon that, when executed by the processor cause the processor to perform the method of any of sections 1-22.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of docking an accessory device to an electronic device, the method comprising the accessory device:
   receiving a first transmission energy in an electromagnetic field for wireless charging of the accessory device from the electronic device;
   in response to receiving the first transmission energy:
      setting a timer, and
      entering a docked mode; and
   exiting the docked mode upon expiration of the timer,
   wherein the docked mode includes one or more components of the accessory device operating at lower power consumption.

2. The method of claim 1, wherein the docked mode is a sleep mode.

3. The method of claim 1, wherein the docked mode includes disabling at least one or more components of the accessory device.

4. The method of claim 1, wherein the docked mode is a high-power mode.

5. The method of claim 1, further comprising:
   receiving a second transmission energy while in the docked mode, and
   resetting the timer upon receiving the second transmission energy.

6. The method of claim 5, wherein the first transmission energy and the second transmission energy have different magnitudes.

7. The method of claim 1, wherein the docked mode modifies at least one communication function of the accessory device.

8. The method of claim 1, wherein the docked mode disables a radio frequency wireless communication device of the accessory device.

9. The method of claim 1, wherein the docked mode decreases a frequency of output communications of the accessory device.

10. The method of claim 1, wherein the accessory device is a stylus and the docked mode disables an inking function of the stylus.

11. The method of claim 1, wherein the accessory device is a smartphone and the docked mode is an airplane mode.

12. The method of claim 1, wherein the accessory device is a keyboard and the docked mode enables keystroke inputs.

13. The method of claim 1, wherein the accessory device is a speaker and the docked mode disables a speaker driver.

14. The method of claim 1, wherein the docked mode modifies one or more sensor functions of the accessory device.

15. The method of claim 14, wherein the accessory device is an optical mouse and the docked mode disables the optical sensor component.

16. The method of claim 1, wherein the timer is at least 250 milliseconds.

17. The method of claim 1, wherein the docked mode includes disabling an output function of at least one or more components of the accessory device.

18. The method of claim 1, further comprising:
   receiving a charging energy while in the docked mode, and
   resetting the timer upon receiving the charging energy.

19. A non-transitory computer readable medium that, when executed by a processor, causes the processor to perform the method of claim 1.

20. An electronic accessory device, the accessory device comprising:
   a processor;
   a near-field communication receiver in communication with the processor; and
   a hardware storage device in communication with the processor, the hardware storage device having instructions stored thereon that, when executed by the processor, cause the processor to perform the method of claim 1.

* * * * *